(12) United States Patent
Appler et al.

(10) Patent No.: US 11,370,947 B2
(45) Date of Patent: Jun. 28, 2022

(54) AIR CONDITIONING REFRIGERANT OIL THERMAL ADDITIVE

(71) Applicant: Alltemp Products Company Limited, Pickering (CA)

(72) Inventors: Paul C. Appler, Windsor (CA); Jesse Richard Homenuik, LaSalle (CA); Jordan Gerald Michael Cecile, Tecumseh (CA); Owen Philip Lister, St. Joachim (CA)

(73) Assignee: Alltemp Products Company Limited, Pickering (CA)

( * ) Notice: Subject to any disclaimer, the term of this patent is extended or adjusted under 35 U.S.C. 154(b) by 40 days.

(21) Appl. No.: 16/925,634

(22) Filed: Jul. 10, 2020

(65) Prior Publication Data

US 2020/0339852 A1 Oct. 29, 2020

Related U.S. Application Data

(63) Continuation of application No. 16/203,046, filed on Nov. 28, 2018, now Pat. No. 10,711,172.

(60) Provisional application No. 62/592,071, filed on Nov. 29, 2017.

(51) Int. Cl.
| | | |
|---|---|---|
| *C09K 5/04* | (2006.01) |
| *C09K 5/20* | (2006.01) |
| *C10M 171/00* | (2006.01) |
| *C10M 139/04* | (2006.01) |
| *C10M 129/16* | (2006.01) |
| *C10N 20/00* | (2006.01) |
| *C10N 30/08* | (2006.01) |
| *C10N 40/30* | (2006.01) |

(52) U.S. Cl.
CPC ............... *C09K 5/041* (2013.01); *C09K 5/20* (2013.01); *C10M 171/008* (2013.01); *C09K 2205/11* (2013.01); *C10M 129/16* (2013.01); *C10M 139/04* (2013.01); *C10M 2207/04* (2013.01); *C10M 2207/2835* (2013.01); *C10M 2227/04* (2013.01); *C10N 2020/101* (2020.05); *C10N 2030/08* (2013.01); *C10N 2040/30* (2013.01)

(58) Field of Classification Search
CPC ...... C10M 171/008; C10M 2207/2835; C10M 2227/04; C10M 2203/065; C10M 2205/003; C10M 2209/062; C10M 139/04; C09K 3/12; C09K 2205/11; C09K 5/041; C09K 5/20
See application file for complete search history.

(56) References Cited

U.S. PATENT DOCUMENTS

| | | | |
|---|---|---|---|
| 5,051,311 A | 9/1991 | Popa et al. | |
| 7,296,423 B2 * | 11/2007 | Appler | F25B 45/00 62/114 |
| 2005/0268642 A1 | 12/2005 | Appler et al. | |
| 2011/0167841 A1 | 7/2011 | Appler et al. | |

* cited by examiner

*Primary Examiner* — John R Hardee
(74) *Attorney, Agent, or Firm* — Dentons US LLP (57) ABSTRACT

A composition comprising an orthoester and an organosilane, and in some embodiments, a metal deactivator, antioxidant, lubricant and/or corrosion inhibitor. Also, disclosed is use of the composition for use in increasing thermal conductivity of internal fluids in air conditioning and refrigerant systems.

20 Claims, 3 Drawing Sheets

A - LOW SIDE PORT
B - HIGH SIDE PORT
C - INDOOR COIL
D - OUTDOOR COIL
E - COMPRESSOR
F - TXV
G - FILTER/DRYER
H - HOT GAS DISCHARGE
I - REVERSING VALVE
J - ACCUMULATOR

AIR CONDITIONING REFRIGERANT OIL THERMAL ADDITIVE

CROSS-REFERENCE TO RELATED PATENT APPLICATIONS

This patent application is a Continuation of U.S. patent application Ser. No. 16/203,046 filed 28 Nov. 2018; which claims a benefit of U.S. Patent Application Ser. No. 62/592,071 filed Nov. 29, 2017, each of which is herein incorporated by reference for all purposes.

TECHNICAL FIELD

The specification relates to a composition, use of the composition, and a method for increasing thermal conductivity of internal fluids in air conditioning and refrigeration systems (AC&R).

BACKGROUND

Air conditioning and refrigeration systems of all shapes and sizes are in common use throughout industry, commercial establishments, public buildings and residences. Among these AC&R systems are vapor compression refrigerant systems that can generally characterized as systems which circulate a compressor fluid containing lubricating oil and a type of refrigerant gas that is compressible into a liquid and which is then expanded for absorption of heat.

There is a need in the art for a composition that can increase the efficiency of these systems. Moreover, there is a need in the art for a composition that can be used to reduce compressor amperage draw by increasing thermal conductivity in both the refrigerant and oil mixture, thereby also increasing heat transfer in both the condenser and evaporator. Additionally increasing heat transfer away from the compressor reduces mechanical wear and additive oil breakdown, thus maximizing compressor and oil life span.

SUMMARY OF INVENTION

This specification provides a composition containing an organosilane component and an orthoformate component. In some embodiments, the organosilane component is selected from alkylsilane, dialkylsilane, polyalkylsilane, organochlorosilane, organodichlorosilane, organopolychlorosilane, or oxalkylsilane. In further embodiments, the organosilane is trimethoxy(methyl) silane or trimethoxy(vinyl) silane. In other embodiments, the orthoformate component is selected from trimethylorthoformate (TMOF), triethylorthoformate (TEOF), trimethylorthoacetate (TMOA), triethylorthoacetate (TEOA). triisopropylorthoformate (TIPOF), or triisopropylorthoacetate (TIPOA), or triethylorthobenzoate (TEOB). In yet further embodiments, the orthoformate component is triethylorthoformate. In some embodiments, the weight ratio of organosilane:orthoformate ranges from approximately 1:1 to approximately 1:40. In further embodiments, the weight ratio of organosilane:orthoformate is approximately 1:50. In some embodiments, the organosilane content in the composition is between 0.3-27% by weight. In some embodiments, the orthoformate content in the composition is between 10-70% by weight. In yet other embodiments, the composition includes a metal deactivator, an antioxidant, a lubricant or a corrosion inhibitor, and combinations thereof. The composition may also include a dye in some embodiments, such as a fluorescent dye, a perylene or naphthalimide, or a derivative thereof.

The present disclosure also provides a method of protecting an AC&R system. The method includes the step of introducing a composition comprising an organosilane component and an orthoformate component into the AC&R system. In further embodiments, the method includes the step of operating the AC&R system under standard conditions for at least 24 hours. In other embodiments, the organosilane component does not polymerize within the AC&R system. In yet further embodiments, the method includes the step of increasing the thermal conductivity of an oil and refrigerant in the AC&R system. In further embodiments of the method, the organosilane content in the composition is between about 0.3-27% by weight. In other embodiments of the method, the orthoformate content in the composition is between about 10-70% by weight. In yet further embodiments, the method includes the step of protecting other substrates in the closed AC system. In yet other embodiments of the method, the method includes the step of increasing heat transfer in the AC&R system by preventing coating of the system with the organosilane. In other embodiments of the method, the method includes the step of increasing heat transfer in the AC&R system by increasing heat transfer in an oil and a refrigerant within a compressor in the AC&R system by removing greater amounts of heat and thereby reducing compressor load. In other embodiments of the method, the organosilane is a trimethoxy (methyl) silane. In yet further embodiments of the method, the orthoformate is a triethylorthoformate.

Also provided is a method of protecting the metallurgy in a closed AC system. The method includes the steps of supplying to the closed AC system a composition containing an organosilane component and an orthoformate component; allowing the orthoformate component to react with water in the system; and preventing the organosilane from polymerizing.

Also provided is a can comprising the composition described herein for protecting a refrigeration or air-conditioning system.

Further embodiments provide a kit including a can and instructions for use.

DETAILED DESCRIPTION

As noted above, in one aspect, the specification relates to a composition containing an orthoester and an organosilane.

In certain aspects, the specification provides a composition containing an orthoester which is an orthoformate. The term orthoformate will be understood by those skilled in the art. Examples of orthoformates can include, for example and without limitation, trimethylorthoformate (TMOF), triethylorthoformate (TEOF), trimethylorthoacetate (TMOA), triethylorthoacetate (TEOA). triisopropylorthoformate (TIPOF), or triisopropylorthoacetate (TIPOA), and triethylorthobenzoate (TEOB). In still further embodiments, the orthoformate is triethylorthoformate. In some embodiments, the weight percentage of the orthoformate in the composition ranges from about 10-70%, 10-40%, 20-60%, 10-35%, 15-30%, 20-25%, 25-30%, 35-40%, 45-50%, 50-55%, 55-60%, 60-65%, or 65-70%. In further embodiments, the orthoformate is approximately 10%, 15%, 20%, 25%, 30%, 35%, 40%, 45%, 50%, 55%, 60%, 65%, or 70% of the composition.

The term organosilane will be understood by those skilled in the art. Examples of organosilanes can include, for example and without limitation, alkylsilane, dialkylsilane, polyalkylsilane, organochlorosilane, organodichlorosilane, organopolychlorosilane, oxalkylsilane, trimethoxy(methyl)silane trimethoxy(vinyl)silane, or combinations thereof. In some embodiments, the organosilane is trimethoxy(methyl)silane or trimethoxy(vinyl)silane. In some embodiments, the weight percentage of the organosilane in the composition ranges from 0.3-27%, 0.4-1.75%, 0.5-1.5%%, or 1.0-1.25% or 2-27%. In still further embodiments, the organosilane is approximately 0.3-27%, 0.4%, 0.5%, 0.75%, 1.0%, 1.25%, 1.5%, 1.75%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, or 27% of the composition. The below reactions occur in the AC&R system.

Hydrolysis: $RSi(OCH_3)_3 + 3H_2O \rightarrow RSi(OH)_3 + 3OCH_3OH$

Condensation: $RSi(OCH_3)_3 + RSi(OCH_3)_3 \rightarrow 2H_2O + RSi(OH_2)_3 +$ OH Substrate Hydrogen Bonding: $RSi(OH_2)_3 + OH\ Substrate \rightarrow 2H_2O + RSi(OH_2)_3$ Substrate Initially, hydrolysis of an alkoxysilane occurs forming a silanetriol. This step is crucial in the development of the polysiloxane blueprint. The other product produced by hydrolysis is methanol (or alkyl alcohol depending on the organosilane being used) which acts as an inert compound in an AC&R environment. Two alkoxysilanes molecules are hydrolyzed prior to the condensation reaction. In the condensation reaction, the silanetriol reacts with previously formed silanetriols to form a polysiloxane oligomer. A secondary product formed from this reaction is water that is cycled back through the hydrolysis reaction. Once a base oligomer has been formed, it then begins bonding to an inorganic substrate. This reaction requires open ended hydroxyl groups to bond. Hydrogen bonding begins at the site of the substrate between both hydroxyl groups forming an unstable compound. Due to instability, water is dislodged and the polysiloxane polymer couples to the inorganic substrate.

Figure 1:
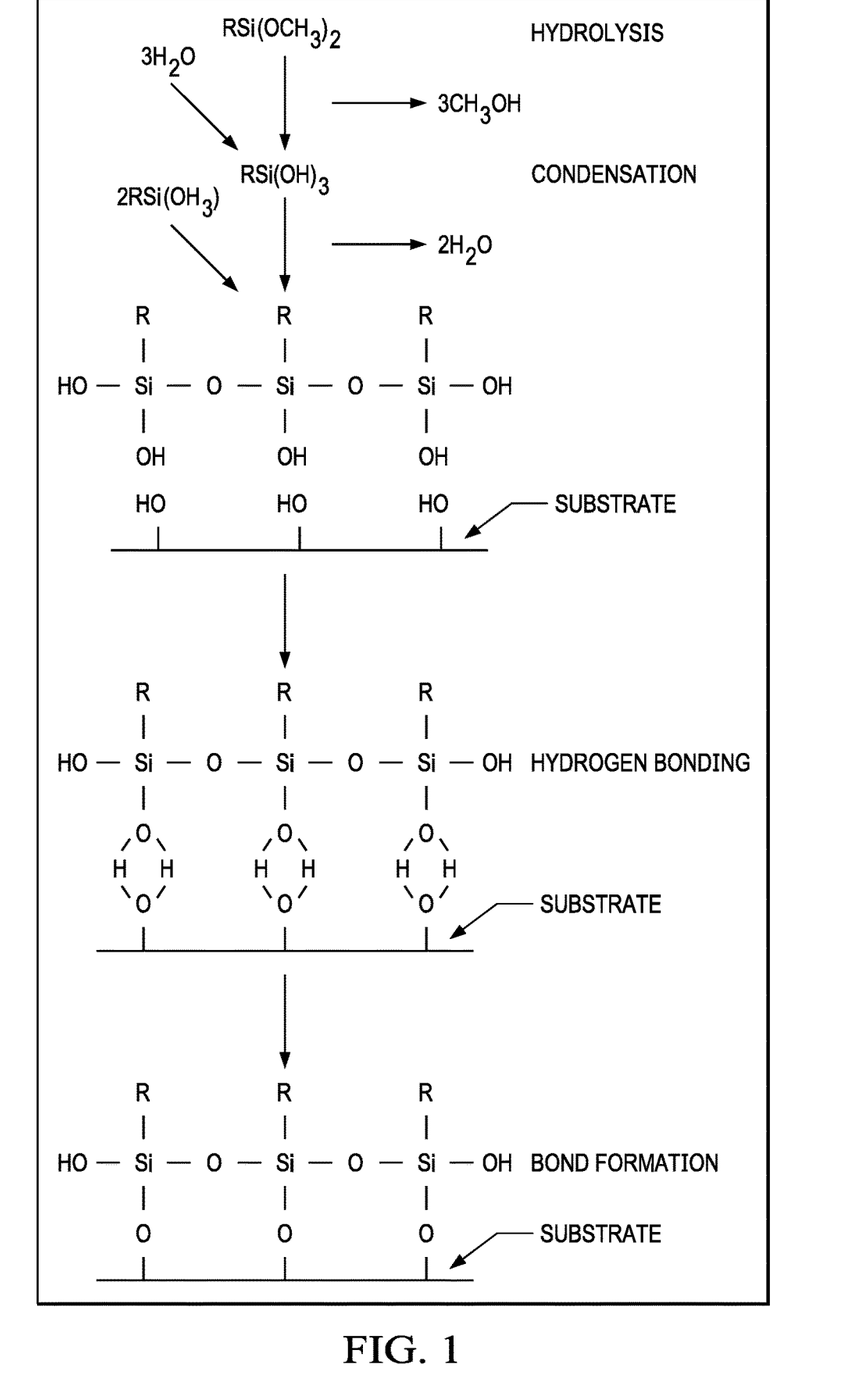
FIG. 1 shows how silane reacts inside an AC&R system with water in a process without the composition described in this specification.

Hydrolysis of an organosilane is key for coupling. Therefore, if no moisture is present, hydrolysis of organosilane molecules will not occur. Orthoformates act to remove moisture content in the oil and refrigerant rendering the organosilanes entirely inactive for coupling. Thus, delivering a composition containing both an orthoformate and organosilane acts to remove moisture content of the oil and refrigerant and prohibits organosilane forming polysiloxanes. This reaction mechanism is also shown in FIG. 1.

Figure 2:
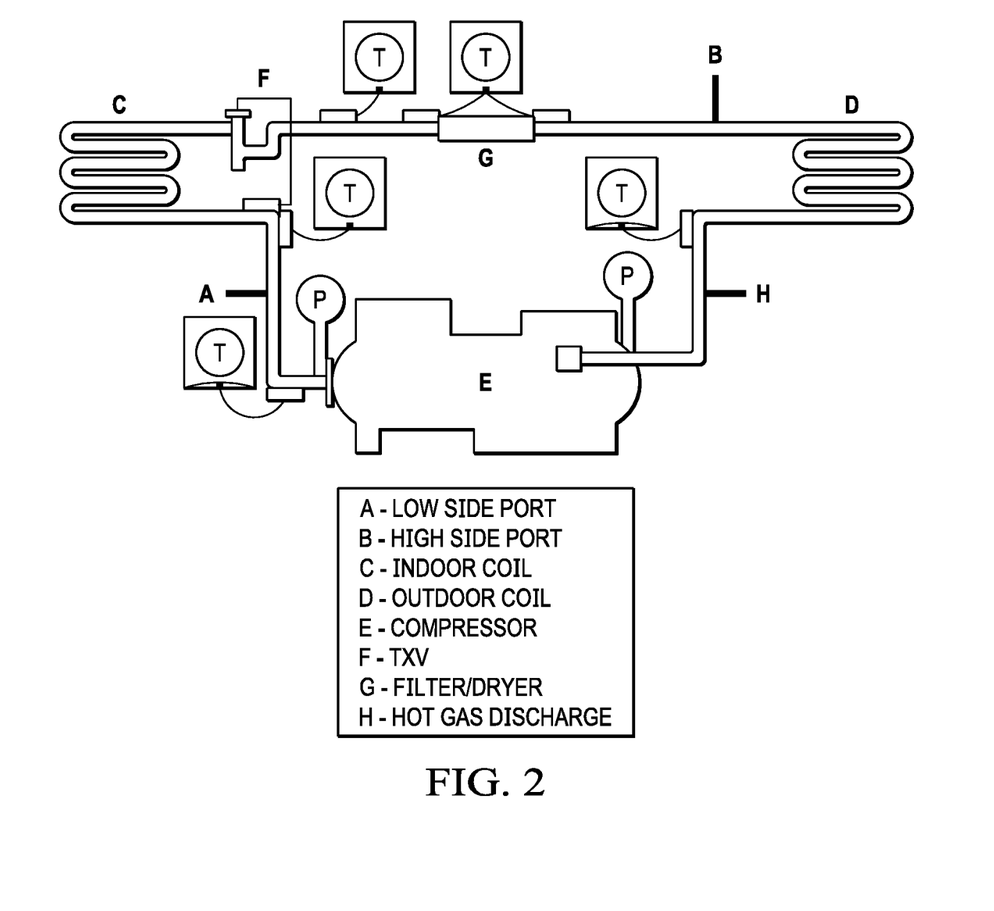
FIG. 2 is a drawing of an AC&R system according to certain embodiments of the specification. A is the low side port; B is the high side port; C is the indoor coil; D is the outdoor coil; E is the compressor; F is the TXV; G is the filter/drier; and H is the hot gas discharge according to certain embodiments of this specification.
Figure 3:
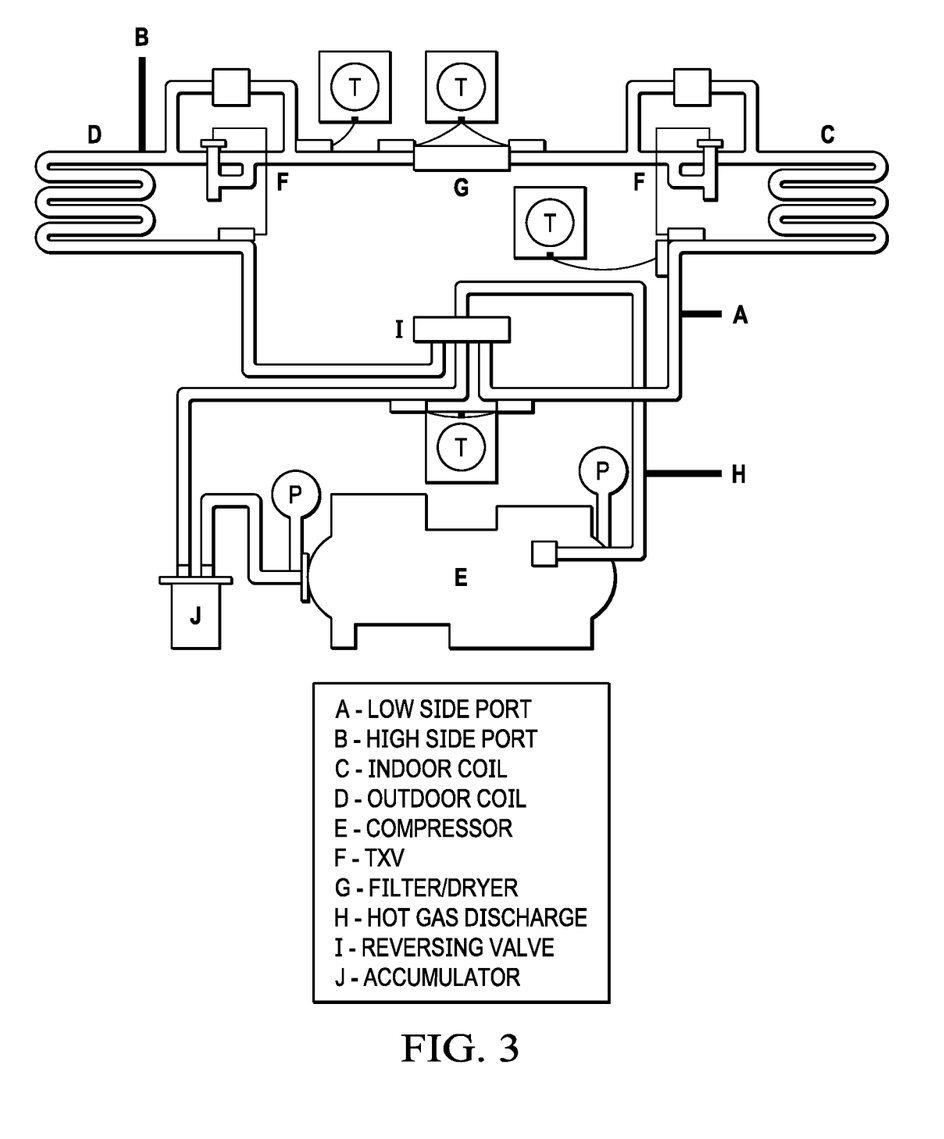
FIG. 3 is a drawing of a heat pump according to certain embodiments of the specification. A is the low side port; B is the high side port; C is the indoor coil; D is the outdoor coil; E is the compressor; F is the TXV; G is the filter/drier; H is the hot gas discharge; I is the reversing valve; and J is the accumulator; according to certain embodiments of this specification.

As shown in FIGS. 2 and 3, the product can be introduced in either the low side port A or high side port B of the system or directly to the compressor E and hot gas discharge downstream of compressor.

Specific ratios of orthoformates and organosilanes combined with a precise viscosity synthetic oil promotes a homogenous mixture, preventing organosilane polymerization while increasing hydrogen bonding of existing oil additives and refrigerants.

The mole ratio of the orthoformate and organosilane is not particularly limited and can depend upon the particular application requirements. The mole ratio of the organosilane to orthoformate can be one-to-one and, in one embodiment, for example and without limitation, range from about 1:1 to about 1:50, about 1:2 to about 1:40, about 1:5 to about 1:30, and values in between. In some embodiments, the mole ratio of orthoformate to organosilane is about 1:2 to about 1:6. In some embodiments, the amount of orthoformate is present in a higher amount, while in other embodiments, the organosilane is present in a higher amount. In a particular embodiment, the molar ratio of organosilane to orthoformate is about 1:40. In another embodiment, the molar ratio of organosilane to orthoformate is about 1:30. In another embodiment, the molar ratio of organosilane to orthoformate is about 1:20.

In further embodiments, additional additives are supplied to the system. Other additives can include antioxidants and metal deactivators, sealants, Moisture Eliminators, Acid Neutralizers, Acid Scavengers or Internal Flush, pH Buffer, fluorescent dyes, phosphorescent dyes and/or colored dyes. These components can be used in tandem or utilized in keeping the organosilane stable while in a homogenous mixture.

In some embodiments, the antioxidant can include Irganox L06, Irganox 1098, Irganox 1076, Irganox 1010, Vanlube 7723, Vanlube 887, zinc dialkyldithiophosphate (ZDDP), Trioleyl phosphite, Triauryl trithio phosphite, Phenylene diamine, Alkylated phenol, and Irgafos 168.

Metal deactivators are used in conjunction with the previously stated components to restrict a reaction between a metal surface and the organosilane. Since these metal deactivators coat the surface of the metal, it creates a barrier between the metal surface and the organosilane which further impedes any coupling reactions from occurring. In some embodiments, the metal deactivator can be Irgamet 39, Irgamet 42, Cuvan 484, Cuvan 826, Cuvan 303, NACAP, Vanchem 2,5-Dimercapto-1,3,4-thiadiazole (DMTD), Vanchem NATD, Vanlube 601, Vanlube AZ, methionine, methionine anhydride, or Irgamet 30.

Also provided by the specification are methods of using the compositions described herein. The introduction of these compositions into an AC&R system can significantly reduce compressor amperage draw by increasing thermal conductivity in both refrigerant and oil mixtures. The introduction of these compositions can also increase the temperature, thus maximizing heat transfer in both the condenser and the evaporator.

Various embodiments of the composition will react with oil additives and refrigerant found in AC&R systems in such a way as to repair, restore and stabilize existing properties within the oil refrigerant mixture. In certain embodiments according to this specification, the described methods take place within a sealed controlled environment, which has the effect to produce chemical processes which fortify existing properties already present in the refrigerant and oil.

In some embodiments, the method includes protecting an AC&R system comprising the step of introducing a composition containing an organosilane component and an orthoformate component into the AC&R system. In some embodiments, the composition is introduced via injection. In further embodiments, the method includes operating the AC&R system under standard conditions for a few minutes or up to 24 hours. In some embodiments, the method includes operating the AC&R system for at least 30 minutes, at least 1 hour, at least 2 hours, at least 5 hours, at least 10 hours, at least 15 hours, at least 25 hours, at least 40 hours, at least 50 hours, or at least 100 hours. In further embodiments, the organosilane component does not polymerize within the AC&R system, and therefore does not form a coating on the components of the AC&R system. In yet further embodiments, the method includes the step of increasing the thermal conductivity of an oil and a refrigerant in the AC&R system. In certain embodiments, the oil is selected from oils such as alkylbenzene (AB), polyolester (POE), polyalkylene glycol (PAG), mineral oil (MO), polyalphaolefin (PAO), and polyvinylether (PVE), and combinations thereof. In certain embodiments, the refrigerant is selected from HFO, HFC, HCFC, HC, CFC, FC, $CO_2$, $NH_3$.

In yet further embodiments, the method further includes the step of protecting various substrates in the AC&R system. For instance, other substrates that may be protected include components made of material such as copper, aluminum, steel, cast iron, stainless steel, brass, and zinc.

According to yet further embodiments, the method further includes increasing heat transfer in a whole system of the AC&R system by preventing coating of the whole system with the organosilane.

In yet another embodiment, specification does not require an oil base or carrier and can be formulated with TEOF as an alternate to a base or carrying agent.

In yet another embodiment, provided is a method further including the step of increasing heat transfer in a whole system of the AC&R system by increasing heat transfer in an oil and a refrigerant within a compressor in the AC&R system by removing greater amounts of heat and thereby reducing compressor load. In further embodiments, the compressor is a semi hermetic compressor.

In yet another embodiment, provided is a method of protecting the metallurgy in a closed AC&R system comprising the steps of supplying to the closed AC&R system a composition containing an organosilane component and an orthoformate component; allowing the orthoformate component to react with water in the system; and preventing the organosilane from polymerizing.

In some embodiments as described in the present specification, to achieve optimal results for the AC&R Refrigerant and Oil Thermal Additive, a 0 to 24 hour runtime may be required.

In another further embodiment in accordance with the specification, the composition for neutralizing or removal of an acid in refrigeration or air-conditioning system further comprises a dye. The dye used is not particularly limited and can include fluorescent dyes, phosphorescent dyes and/or colored dyes. In one embodiment, for example and without limitation, the dye used is perylene or naphthalimide, or its derivatives. Such dyes can be used for leak detection purposes.

The composition described herein can be supplied in a canister as a separate product or as part of a kit. The canister containing the composition can be present under reduced pressure, such as a vacuum-packed can, where upon connection of the canister with the air-conditioning or refrigeration system, allows the contents of the canister to be added to the air-conditioning or refrigeration system. Alternatively, the canister containing the composition can be a pressurized can with propellant. The propellant used is not particularly limited, and can include, for example and without limitation, nitrogen, carbon dioxide or other gaseous propellant. In another embodiment, the composition can be injected into the system using a syringe or syringe-type system. Alternatively, the canister containing the composition can be poured into a separate fluid injector and propelled into the system. In a further embodiment, for example and without limitation, the composition can be provided to the system using a flexible-expanding tube, where the tube is sealed at one end and the other end consists of a two-way flow fitting that can be attached to the refrigeration or air-conditioning system. In a further embodiment, for example and without limitation, the composition can be provided to the system using a flexible-expanding or rigid tube, where the tube is connected from the high side to the low side where both ends have fittings that can be attached to the refrigeration or air-conditioning system As described herein, embodiments of the invention improve efficiency and performance by increasing thermal energy of oil and refrigerant within an AC&R system.

EXAMPLES

The composition containing an organosilane component and an orthoformate component were tested in seven lab packaged air conditioning units and two split air conditioning units.

The seven lab packaged units were 5000 BTU R410A systems. These seven lab packaged units were configured to record the following properties daily: evaporator outlet, condenser outlet, evap air flow out, high side pressure, low side pressure, starting amperage, running amperage (after 1 hour runtime), environmental measurements (external measurements), room temperature and humidity, condenser inlet, and evaporator inlet.

The seven lab packaged units were also configured with low/high side service ports and system charged with 8.5 oz of R410A refrigerant. The lab packaged units were set to run for an initial period of approximately 80 hours as a break-in period. Initial data collected during this 80-hour break-in period was then compared to the readings after injection of the AC&R Refrigerant and Oil Thermal Additive formulation. 5 ml variations of the additive formulations as shown in Table 1 were injected into six of the seven lab packaged units through the low side service port after the initial 80-hour break-in period.

TABLE 1

Additive Formulations

| Contents | % (w/w) |
|---|---|
| General Variant 1 - Unit 1 | |
| Trimethoxy(methyl)silane | 0.5 |
| Ciba Irganox L 06 | 1 |
| Triethylorthoformate | 21 |
| POE 68 | 74 |
| Irgamet 39 | 1.5 |
| Irgacor L12 | 2 |
| Totals | 100 |
| Moisture Removal Variant 2 - Unit 2 | |
| Ciba Irganox L 06 | 1.5 |
| Triethylorthoformate | 32 |
| POE 32 | 63.5 |

TABLE 1-continued

Additive Formulations

| Contents | % (w/w) |
|---|---|
| Irgacor L12 | 1.5 |
| Irgamet 39 | 1.5 |
| Totals | 100 |

1.8 ml Trimethoxy(methyl)silane added after 150 initial hours
Corrosion Prevention Variant 3 - Unit 3

| Contents | % (w/w) |
|---|---|
| Trimethoxy(methyl)silane | 1 |
| Ciba Irganox L 06 | 1.5 |
| Triethylorthoformate | 22 |
| POE 68 | 72 |
| Irgamet 39 | 1.5 |
| Irgacor L12 | 2 |
| Totals | 100 |

Low POE Variant 4 - Unit 4

| Contents | % (w/w) |
|---|---|
| Trimethoxy(methyl)silane | 1.5 |
| Irganox | 3 |
| POE 68 | 22.5 |
| Triethylorthoformate | 70 |
| Irgamet 39 | 1 |
| Irgacor L12 | 2 |
| Totals | 100 |

Non Complex Variant 5 - Unit 5

| Contents | % (w/w) |
|---|---|
| POE 68 | 74 |
| Triethylorthoformate | 22.5 |
| Irgamet 39 | 1.5 |
| Irgacor L12 | 2 |
| Totals | 100 |

Sound Dampening Variant 6 - Unit 6

| Contents | % (w/w) |
|---|---|
| POE 68 | 83 |
| Triethylorthoformate | 13.5 |
| Irgamet 39 | 1.5 |
| Irgacor L12 | 2 |
| Totals | 100 |

1.8 ml Trimethoxy(methyl)silane added after 150 initial hours

The seven lab packaged units were then run approximately 400 hours for data analysis. After 150 hours, an extra 1.8 ml of trimethoxy(methyl) silane was injected into units 2 and 6. These formulas did not have the methyl silane present initially. The results after 150 hours for these two initial formulations was not significant enough, leading to the addition of methyl silane, thus producing a reduced amperage draw.

After 400 hours, the results were analyzed and the formulation that showed the most significant improvement with heat transfer and amperage draw was selected for stage 2 testing.

Optimal formulation injected into one of the two 2.5 Ton R410A split units for stage 2 testing (Unit #251131 and Unit #251139). The optimal formulation will be injected into unit #251139 with unit #251131 acting as a control system and the data is expected to be comparable to the test split unit.

All variations tested have either POE32 or POE68 oil, triethylorthoformate, Irgamet 39, and Irgacor L12. Several other additives are present in some cases: Irganox L06 and Trimethoxy(methyl) silane. Table 2 shows the formulations, runtimes, and results for each of the lab packaged units.

TABLE 2

Formulations, Runtimes, and Results

| Lab Packaged Unit | Description | Runtime (Hour) | Results |
|---|---|---|---|
| 1 | Average solution with a balance of all additives<br>Base oil of POE 68 | 400 | Stable Heat Transfer<br>Significant Drop in Start & Running Amperage Draw |
| 2 | Base oil of POE 32<br>No trimethoxy(methyl)silane added initially<br>After 150 hours, 1.8 ml of methyl silane was added<br>Moisture removal variant | 480 | Significant Drop in Heat Transfer<br>Significant Drop in Start Amperage Draw<br>Minimal Drop in Running Amperage Draw |
| 3 | Base oil of POE 68<br>Formulation contains a higher percentage of additives within the solution<br>Corrosion prevention variant | 400 | Minimal Drop in Heat Transfer<br>Significant Drop in Start Amperage Draw |
| 4 | Base TEOF<br>Formulation contains a higher percentage of TEOF with a lower percentage of POE68<br>Low POE variant | 400 | Minimal Drop in Heat Transfer<br>Significant Drop in Start/Running Amperage Draw |
| 5 | Base oil of POE68<br>Formulation contains no trimethoxy(methyl)silane or Irganox L06<br>Non complex variant | 400 | Significant Drop in Heat Transfer<br>Minimal Drop in Start/Running Amperage Draw |
| 6 | Base oil of POE 68<br>No trimethoxy(methyl)silane added initially<br>After 150 hours, 1.8 ml of methyl silane was added<br>Lubricating Variant | 480 | Significant Drop in Heat Transfer<br>Minimal Drop in Start/Running Amperage Draw |
| 7 | No Product Added<br>Monitored as a control for the other units | 400 | Significant Drop in Heat Transfer<br>Minimal Raise in Start/Running Amperage Draw |

It is understood that drops in heat transfer can be attributed to the loss of refrigerant through the detaching of the pressure probes routinely from each lab packaged unit for several months. It is believed that this produces a gradual decrease in heat transfer as refrigerant and product is slowly lost from the lab packaged units. A small amount of refrigerant and product is removed from each detachment, effectively lowering heat transfer over time. In addition, optimal heat transfer results were obtained in the compressor shell due to the greater volume of refrigerant and oil present. Greater heat transfer should be observed where larger surface areas are present such as industrial AC&R air to air, air to water, and air to transfer fluid.

As shown in Table 3, the data collected before the product composition was added is shown as the "Before Prod" ("Before Product") which is the average data for the 80 hours of run time are shown in the top row for each apparatus. The "After Prod" ("After Product") numbers shown for each apparatus reflect the average data for 320-400 hours of run time with the composition added. "Add Silane" ("Additional Silane") shows average data for 80 hours run time after the trimethoxy(methyl)silane was injected.

TABLE 3

Before and After Data for In Lab Packaged Unit

In Lab Packaged Unit #1

| | Rel Hum | Amb | Evap Inlet (T) | Evap Outlet (T) | Cond Inlet (T) | Cond Outlet (T) | Evap Air flow (T) | HP | LP | Start Amp | Amp | ΔT Amb. |
|---|---|---|---|---|---|---|---|---|---|---|---|---|
| Before Prod | 54% | 74.73 | 46.85 | 52.99 | 152.29 | 93.42 | 49.01 | 388 | 123 | 3.92 | 1.33 | 25.72 |
| After Prod | 47% | 74.57 | 41.76 | 50.16 | 149.97 | 91.82 | 49.12 | 354 | 113 | 2.52 | 1.18 | 25.60 |

Pros: Stable Heat Transfer, Significant Drop in Start & Running Amperage Draw

In Lab Packaged Unit #2

| | Rel Hum | Amb | Evap Inlet (T) | Evap Outlet (T) | Cond Inlet (T) | Cond Outlet (T) | Evap Air flow (T) | HP | LP | Start Decibels | Decibels | Start Amp | Amp | ΔT Amb |
|---|---|---|---|---|---|---|---|---|---|---|---|---|---|---|
| Before Prod | 54% | 74.63 | 47.08 | 53.49 | 158.04 | 100.27 | 49.93 | 395 | 124 | 71.70 | 77.05 | 3.82 | 1.52 | 24.69 |
| After Prod | 48% | 74.61 | 47.13 | 55.26 | 159.65 | 98.80 | 55.50 | 389 | 125 | 67.97 | 75.31 | 2.80 | 1.33 | 19.11 |
| Add Silane | 47% | 74.67 | 45.72 | 56.18 | 164.10 | 105.04 | 60.48 | 407 | 125 | 66.17 | 74.77 | 2.85 | 1.43 | 14.19 |

Pros: Significant Drop in Start Amperage Draw, Minimal Drop in Running Amperage Draw
Cons: Higher Pressures, Significant Drop in Heat Transfer In Lab Packaged Unit #3

| | Rel Hum | Amb | Evap Inlet (T) | Evap Outlet (T) | Cond Inlet (T) | Cond Outlet (T) | Evap Air flow (T) | HP | LP | Start Amp | Amp | ΔT Amb |
|---|---|---|---|---|---|---|---|---|---|---|---|---|
| Before Prod | 51% | 75.49 | 50.05 | 46.28 | 146.59 | 97.78 | 51.57 | 422 | 130 | 3.82 | 1.21 | 23.93 |
| After Prod | 47% | 74.61 | 47.88 | 53.01 | 154.25 | 94.07 | 55.18 | 391 | 127 | 2.77 | 1.26 | 19.43 |

Pros: Significant Drop in Start Amperage Draw
Cons: Significant Rise in Running Amperage, Minimal Drop in Heat Transfer In Lab Packaged Unit #4

| | Rel Hum | Amb | Evap Inlet (T) | Evap Outlet (T) | Cond Inlet (T) | Cond Outlet (T) | Evap. Air flow (T) | HP | LP | Start Amp | Amp | ΔT Amb |
|---|---|---|---|---|---|---|---|---|---|---|---|---|
| Before Prod | 51% | 75.14 | 47.24 | 46.28 | 150.55 | 95.36 | 49.43 | 402 | 126 | 3.32 | 1.34 | 25.72 |
| After Prod | 47% | 74.40 | 44.55 | 52.39 | 155.75 | 93.57 | 52.11 | 380 | 121 | 2.68 | 1.04 | 22.29 |

Pros: Significant Drop in Start/Running Amperage Draw
Cons: Minimal Drop in Heat Transfer In Lab Packaged Unit #5

| | Rel Hum | Amb | Evap Inlet (T) | Evap Outlet (T) | Cond Inlet (T) | Cond Outlet (T) | Evap Air flow (T) | HP | LP | Start Amp | Amp | ΔT Amb |
|---|---|---|---|---|---|---|---|---|---|---|---|---|
| Before Prod | 54% | 74.56 | 46.12 | 51.68 | 149.06 | 92.91 | 49.28 | 373 | 123 | 4.00 | 1.29 | 25.27 |
| After Prod | 47% | 74.59 | 44.40 | 55.35 | 157.11 | 97.55 | 58.38 | 385 | 121 | 2.77 | 1.26 | 16.22 |

Pros: Minimal Drop in Start/Running Amperage Draw
Cons: Higher Pressures, Significant Drop in Heat Transfer TABLE 3-continued Before and After Data for In Lab Packaged Unit In Lab Packaged Unit #6

|  | Rel Hu | Amb | Evap Inlet (T) | Evap Outlet (T) | Cond Inlet (T) | Cond Outlet (T) | Evap Air flow (T) | HP | LP | Start Decibels | Decibels | Start Amp | Amp | ΔT Ambient |
|---|---|---|---|---|---|---|---|---|---|---|---|---|---|---|
| Before Prod | 51% | 75.22 | 47.55 | 44.34 | 140.14 | 94.52 | 50.45 | 395 | 126 | 69.77 | 75.32 | 3.51 | 1.47 | 24.77 |
| After Prod | 49% | 74.27 | 47.61 | 46.03 | 141.22 | 89.58 | 51.04 | 377 | 129 | 68.14 | 75.06 | 2.68 | 1.33 | 24.64 |
| Add Silane | 47% | 74.73 | 45.97 | 56.34 | 159.99 | 97.91 | 59.10 | 382 | 124 | 65.75 | 75.65 | 2.56 | 1.27 | 15.62 |

Pros: Minimal Drop in Start/Running Amperage Draw
Cons: Significant Drop in Heat Transfer In Lab Packaged Unit #7 (Control Unit, No Product Injected)

|  | Rel Hum | Amb | Evap Inlet (T) | Evap Outlet (T) | Cond Inlet (T) | Cond Outlet (T) | Evap Air flow (T) | HP | LP | Start Amp | Amp | ΔT Amb |
|---|---|---|---|---|---|---|---|---|---|---|---|---|
| No Prod | 48% | 74.63 | 44.17 | 52.63 | 160.18 | 99.10 | 60.30 | 394 | 120 | 3.30 | 1.31 | 14.22 |
| After 400 hours | 54% | 74.69 | 46.71 | 46.39 | 148.47 | 89.92 | 48.95 | 376 | 124.47 | 4.36 | 1.35 | 7.35 |

Cons: Significant Drop in Heat Transfer
Minimal Raise in Start/Running Amperage Draw Lab Packaged Unit #1 with the General Variant AC&R Refrigerant and Oil Thermal Additive formulation had significant results with lower pressures, and lower amperage draw. Compared to Lab Packaged Unit #2-7, Lab Packaged Unit #1 did not lose its heat transfer ability over time after the formulation was injected.

Similar procedures were followed for Field Units, as shown below.

Field Test Unit 1—Port Saint Lucie Fla.

| Brand | American Standard |
|---|---|
| Location | Port Saint Lucie |
| Reason for service call | Maintenance Contract |
| Refrigerant | R-410A |
| Oil | POE |
| Age | 2016 |
| Model Number | 4A7A6049J1000AA |
| Serial number | 16453PMD2F |
| Outside Temperature | 83° F. |
| Amperage before | 10.47 A |
| Amperage after 15 minutes of runtime | 10.35 A |

Injected: AC&R Refrigerant and Oil Thermal Additive POE68

Field Test Unit 2—Port Saint Lucie Fla.

| Brand | American Standard |
|---|---|
| Location | The Cascades, Port Saint Lucie |
| Reason for service call | Maintenance Contract |
| Refrigerant | R-410A |
| Oil | POE |
| Age | 2015 |
| Model Number | 4A7A6042H1000AA |
| Serial number | 15292TW75F |
| Outside Temperature | 85° F. |
| Amperage before | 8.73 A |
| Amperage after 15 minutes of runtime | 8.59 A |

Injected: AC&R Refrigerant and Oil Thermal Additive POE32

Field Test Unit 3—Port Saint Lucie Fla.

| Brand | American Standard |
|---|---|
| Location | Palm City, FL |
| Reason for service call | Maintenance Contract |
| Refrigerant | R-410A |
| Oil | POE |
| Age | 2016 |
| Model Number | 4A7A6061J1000AA |
| Serial number | 16411LSF2F |
| Outside Temperature | 74° F. |
| Amperage before | 11.6 A |
| Amperage after 15 | 11.46 A |

Field Test Unit 4—Port Saint Lucie Fla.

| Brand | Rheem |
|---|---|
| Location | Stuart, FL |
| Reason for service call | System Off |
| Refrigerant | R-410A |
| Oil | POE |
| Age | 2017 |
| Model Number | RA1642AJ1NA |
| Serial number | W231704012 |
| Outside Temperature | 75° F. |
| Amperage before | 10.3 A |
| Amperage after 15 minutes of runtime | 10.1 A |

Notes:
AC&R Refrigerant and Oil Thermal Additive POE68

Field Test Unit 5—Port Saint Lucie Fla.

| Brand | Rheem |
|---|---|
| Location | Port Saint Lucie |
| Reason for service call | Maintenance Contract |
| Refrigerant | R-410A |
| Oil | POE |
| Age | 2015 |
| Model Number | RA1660AJ1NA |
| Serial number | W191516718 |
| Outside Temperature | 75° F. |
| Amperage before | 10.9 A |
| Amperage after 15 minutes of runtime | 10.0 A |

Injected: AC&R Refrigerant and Oil Thermal Additive POE68

Field Test Unit 6—Port Saint Lucie Fla.

| Brand | Trane |
|---|---|
| Location | Port Saint Lucie |
| Reason for service call | Old Contactor was buzzing |
| Refrigerant | R-22 |
| Oil | MO |
| Age | 2006 |
| Model Number | 2TWB3048A1000AA |
| Serial number | 61826694F |
| Outside Temperature | 75° F. |
| Amperage before | 10.2 A |
| Amperage after 15 minutes of runtime | 10.1 A |

Injected: AC&R Refrigerant and Oil Thermal Additive POE68

Lab and field testing demonstrated similar results with amperage decreases. The viscosity of the oil as the body of the chemical composition does not affect the amperage drop. This reinforces that the chemical additives are influencing the amperage drop.

Certain adaptations and modifications of the described embodiments can be made. Therefore, the above discussed embodiments are considered to be illustrative and not restrictive.

What is claimed is:

1. A device comprising:
   a container storing a composition comprising an organosilane component and an orthoformate component, wherein the container is configured for connecting to a port of an air conditioning system or a refrigeration system such that the composition can be input into the port from the container, wherein at least one of:
   the container is a tube with a plurality of end portions each of which is configured for connecting to the port, or
   the container is a syringe or a syringe-type system.

2. The device according to claim 1, wherein the container is a tube that includes an end portion having a fitting configured for connecting to the port such that the composition can be input into the port through the fitting.

3. The device according to claim 2, wherein the fitting is a two-way flow fitting.

4. The device according to claim 1, wherein the container is a tube with a plurality of end portions each of which is configured for connecting to the port.

5. The device according to claim 1, wherein the container is a syringe or a syringe-type system.

6. The device according to claim 1, wherein the container is a flexible-expanding tube or a rigid tube.

7. The device according to claim 1, wherein the organosilane component is selected from alkylsilane, dialkylsilane, polyalkylsilane, organochlorosilane, organodichlorosilane, organopolychlorosilane, oxalkylsilane, trimethoxy(methyl) silane, trimethoxy(vinyl) silane, or combinations thereof, and
   wherein the orthoformate component is selected from trimethylorthoformate (TMOF), triethylorthoformate (TEOF), trimethylorthoacetate (TMOA), triethylorthoacetate (TEOA), triisopropylorthoformate (TIPOF), otriisopropylorthoacetate (TIPOA), triethylorthobenzoate (TEOB), or combinations thereof.

8. The device according to claim 1, wherein the organosilane content in the composition is between about 0.3% by weight and about 27% by weight, wherein the orthoformate content in the composition is between about 10% by weight and about 70% by weight.

9. The device according to claim 1, wherein the composition further comprises a metal deactivator, an antioxidant, a lubricant, or a corrosion inhibitor.

10. The device according to claim 1, wherein the container stores the composition under a reduced pressure.

11. The device according to claim 1, wherein the container stores a propellant for propelling the composition into the port.

12. The device according to claim 1, wherein the port is of the air conditioning system.

13. The device according to claim 1, wherein the port is of the refrigeration system.

14. The device according to claim 1, wherein the port is a low side port.

15. The device according to claim 1, wherein the port is a high side port.

16. The device according to claim 1, wherein the port is of a compressor of the air conditioning system or the refrigeration system.

17. The device according to claim 1, wherein the port inputs into a hot discharge downstream of a compressor of the air conditioning system or the refrigeration system.

18. The device according to claim 1, wherein the composition reduces an amperage draw of a compressor of the air conditioning system or the refrigeration system by increasing a thermal conductivity in a refrigerant mixture of the air conditioning system or the refrigeration system or an oil mixture of the air conditioning system or the refrigeration system, thereby increasing a heat transfer in a condenser of the air conditioning system or the refrigeration system or an evaporator of the air conditioning system or the refrigeration system.

19. The device according to claim 1, wherein the composition reacts with an oil additive in the air conditioning system or the refrigeration system or a refrigerant found in the air conditioning system or the refrigeration system in such a way as to repair, restore, or stabilize an existing property within an oil refrigerant mixture of the air conditioning system or the refrigeration system.

20. A method comprising:
   receiving a container storing a composition comprising an organosilane component and an orthoformate component, wherein the container is configured for connecting to a port of an air conditioning system or a refrigeration system such that the composition can be input into the port from the container, wherein at least one of:
   the container is a tube with a plurality of end portions each of which is configured for connecting to the port, or
   the container is a syringe or a syringe-type system.

* * * * *